(12) United States Patent
Oribe et al.

(10) Patent No.: US 9,872,177 B2
(45) Date of Patent: Jan. 16, 2018

(54) USER AUTHENTICATION METHOD, MONITORING SYSTEM, MONITORING APPARATUS, AND ELECTRONIC EQUIPMENT

(71) Applicant: Seiko Epson Corporation, Tokyo (JP)

(72) Inventors: Takumi Oribe, Minamiminowa-mura (JP); Nobuyuki Saito, Sapporo (JP); Masahiko Mizuta, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/446,738

(22) Filed: Mar. 1, 2017

(65) Prior Publication Data
US 2017/0265072 A1    Sep. 14, 2017

(30) Foreign Application Priority Data

Mar. 8, 2016  (JP) .................................. 2016-044690

(51) Int. Cl.
| | |
|---|---|
| *H04M 1/66* | (2006.01) |
| *H04M 1/68* | (2006.01) |
| *H04M 3/16* | (2006.01) |
| *H04W 12/06* | (2009.01) |
| *H04W 60/04* | (2009.01) |

(Continued)

(52) U.S. Cl.
CPC ......... *H04W 12/06* (2013.01); *H04M 1/0202* (2013.01); *H04N 1/00323* (2013.01); *H04N 1/32122* (2013.01); *H04N 1/32539* (2013.01); *H04N 1/4413* (2013.01);

(Continued)

(58) Field of Classification Search
CPC .. H04W 12/06; H04W 60/04; H04N 1/32539; H04N 1/32122; H04N 1/00323; H04N 1/4413; H04N 2201/3205; H04N 2201/0082; H04M 1/0202
See application file for complete search history.

(56) References Cited

U.S. PATENT DOCUMENTS

| | | | |
|---|---|---|---|
| 7,130,066 B1 * | 10/2006 | Kanematu | ............. H04L 63/083 358/1.14 |
| 2006/0092453 A1 * | 5/2006 | Okada | ................ H04N 1/00411 358/1.14 |

(Continued)

FOREIGN PATENT DOCUMENTS

| | | |
|---|---|---|
| JP | 2004-259191 A | 9/2004 |
| JP | 2016-136307 A | 7/2016 |
| JP | 2016-136309 A | 7/2016 |

*Primary Examiner* — Ajit Patel
(74) *Attorney, Agent, or Firm* — Nutter McClennen & Fish LLP; John J. Penny, Jr.

(57) ABSTRACT

Provided herein is a user authentication method in a monitoring system that communicates with electronic equipment and monitors the electronic equipment. The monitoring system performs processes including: demanding a user to perform predetermined authentication operation that gives rise to a change in running status of the electronic equipment; acquiring, from the electronic equipment, running information that indicates the running status of the electronic equipment, the running status having changed due to the authentication operation; detecting, on a basis of the running information, that the authentication operation has been performed in response to the demand; and permitting, upon detection, the user to access the running information acquired from the electronic equipment.

7 Claims, 9 Drawing Sheets

(51) Int. Cl.
*H04M 1/02* (2006.01)
*H04N 1/00* (2006.01)
*H04N 1/44* (2006.01)
*H04N 1/32* (2006.01)

(52) U.S. Cl.
CPC .... *H04W 60/04* (2013.01); *H04N 2201/0082* (2013.01); *H04N 2201/3205* (2013.01)

(56) References Cited

U.S. PATENT DOCUMENTS

| | | | |
|---|---|---|---|
| 2014/0289837 A1* | 9/2014 | Tomita | H04L 63/0838 |
| | | | 726/8 |
| 2016/0100067 A1* | 4/2016 | Oshima | H04N 1/00204 |
| | | | 358/1.15 |
| 2016/0216925 A1 | 7/2016 | Mizuta et al. | |
| 2017/0064101 A1* | 3/2017 | Kitamura | G06F 3/1207 |

* cited by examiner

USER AUTHENTICATION METHOD, MONITORING SYSTEM, MONITORING APPARATUS, AND ELECTRONIC EQUIPMENT

BACKGROUND

1. Technical Field

The present invention relates to user authentication in a monitoring system that monitors electronic equipment by communicating with the electronic equipment.

2. Related Art

For the purpose of providing various kinds of service to authorized users of electronic equipment and preventing fraudulent access by any person who is not an authorized user of electronic equipment, user authentication procedure is introduced in some monitoring systems that monitor the running status of electronic equipment via a communication channel. For example, the following technique is disclosed in JP-A-2004-259191. Information that is necessary for user registration is transmitted from electronic equipment such as a laser printer to a mobile phone held by a person in charge of user registration for the electronic equipment. On the basis of the information, an electronic mail is transmitted from the mobile phone to a management server. User registration is performed in this way.

In the related art described above, after the establishment of communication link between the electronic equipment and the mobile phone, it is possible to perform user registration just by operating the mobile phone. For this reason, there is a risk of erroneous association of the user with the electronic equipment. For example, there is a possibility that the electronic equipment regarding which the user wants to be registered might not be the same as the communication-established one. Moreover, for example, when registration work is performed for plural pieces of electronic equipment at the same time, there is a possibility of confusion in correspondences between registration-requesting users and the pieces of electronic equipment, resulting in erroneous registration.

SUMMARY

Some aspects of the invention make it possible to perform user authentication processing in a monitoring system that monitors electronic equipment always with a proper association of an authorized user with electronic equipment.

An aspect of the invention is a user authentication method in a monitoring system that communicates with electronic equipment and monitors the electronic equipment. The monitoring system performs processes including: demanding a user to perform predetermined authentication operation that gives rise to a change in running status of the electronic equipment; acquiring, from the electronic equipment, running information that indicates the running status of the electronic equipment, the running status having changed due to the authentication operation; detecting, on a basis of the running information, that the authentication operation has been performed in response to the demand; and permitting, upon detection, the user to access the running information acquired from the electronic equipment.

With this architecture, regarding the electronic equipment, only a user(s) who can perform authentication operation specified by the monitoring system is allowed to access the running information possessed by the monitoring system. This eliminates the problem of improperly granting an access right to any third party who cannot actually perform the operation and the problem of improper association of a user with electronic equipment different from a proper combination. Therefore, it is possible to perform user authentication always with a proper association of an authorized user with electronic equipment.

In the above aspect, for example, the monitoring system may be configured to demand the authentication operation via a terminal apparatus operated by the user. With this architecture, even if the operation is complex operation or operation using data, it is possible to convey the instruction to the user reliably.

In addition, for example, the running information may include information for individual identification of the electronic equipment and information that changes as the electronic equipment runs. With a combination of these kinds of information, it is possible to distinguish a certain piece of electronic equipment from another reliably and prevent erroneous authentication caused due to confusion.

In addition, for example, the authentication operation may include operation of touching the electronic equipment by the user. With this architecture, only a person(s) who can touch the electronic equipment can receive an authentication approval. Moreover, since a user who wants to be authenticated is demanded to perform operation that involves touching the electronic equipment, it is possible to clearly recognize the electronic equipment that is the target equipment for authentication, thereby avoiding inappropriate authentication due to an error or a mistake by the user.

In addition, for example, the authentication operation may include operation of inputting data specified by the monitoring system into the electronic equipment. With this architecture, only a person(s) who can receive data from the monitoring system and can perform operation of inputting the data into the electronic equipment can receive an authentication approval. Moreover, since a user who wants to be authenticated is demanded to perform operation that involves data input into the electronic equipment, it is possible to clearly recognize the authentication target electronic equipment, thereby avoiding wrong authentication.

In addition, for example, the electronic equipment may generate an authentication code that is determined depending on the running information; and the authentication operation may include operation of acquiring the authentication code from the electronic equipment and transmitting the authentication code to the monitoring system. With this architecture, only a person who is in a position to be able to know the authentication code generated by the electronic equipment can receive an authentication approval. Moreover, since running information differs from electronic equipment to electronic equipment, the use of an authentication code that is determined depending on the running information makes it possible to clearly distinguish the authentication target electronic equipment from others, thereby avoiding wrong authentication.

In addition, for example, the monitoring system may be configured to demand the authentication operation in response to an authentication request from the user. Since processing for authentication is performed when the user who requests for accessing the running information shows the intention, it is possible to reduce a risk of erroneously authenticating irrelevant third party.

Another aspect of the invention is a monitoring system that communicates with electronic equipment and monitors the electronic equipment, comprising: an information acquisition section that acquires, from the electronic equipment, running information that indicates running status of the electronic equipment; a user interface section that performs notification of prompting a user to perform predetermined authentication operation that gives rise to a change in the running status of the electronic equipment; and a judgment section that judges whether the authentication operation has been performed or not on a basis of a change in the running information, wherein the user is permitted to access the running information acquired from the electronic equipment in a case where the judgment section judges that the authentication operation has been performed in response to the notification.

Still another aspect of the invention is a monitoring apparatus that communicates with electronic equipment and monitors the electronic equipment, comprising: a communication section that acquires, from the electronic equipment, running information that indicates running status of the electronic equipment, and transmits, to a terminal apparatus that is different from the electronic equipment, a control instruction for notification of a need to perform predetermined authentication operation that gives rise to a change in the running status of the electronic equipment; and a judgment section that judges whether the authentication operation has been performed or not on a basis of a change in the running information, wherein the user of the terminal apparatus is permitted to access the running information acquired from the electronic equipment in a case where the judgment section judges that the authentication operation has been performed in response to the notification.

Still another aspect of the invention is electronic equipment, comprising: a transmission section that transmits running information that indicates running status; a code generation section that generates an authentication code on a basis of the running information and a predetermined generation algorithm; and a notification section that notifies a user of the authentication code.

The configuration of all of them is suited for implementing the user authentication method described above. Their application to the user authentication method described above makes it possible to perform user authentication processing in a monitoring system that monitors electronic equipment always with a proper association of an authorized user with electronic equipment.

The electronic equipment described above may further comprise: a printing section that performs print processing, wherein the running information may be information that changes as the printing section runs. This configuration enables an authenticated user to access running information that changes as the printing section runs and prevents a non-authenticated user from fraudulently accessing the running information.

Not all of plural elements of each exemplary mode of the invention described above are essential. In order to solve a part or a whole of the problems described above, or in order to achieve a part or a whole of effects described in this specification, a part of the plural elements may be changed, deleted, or replaced with any other new element, or a part of limitations may be deleted. In order to solve a part or a whole of the problems described above, or in order to achieve a part or a whole of effects described in this specification, a part or a whole of technical features included in one of the modes of the invention described above may be combined with a part or a whole of technical features included in another to derive an independent mode of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
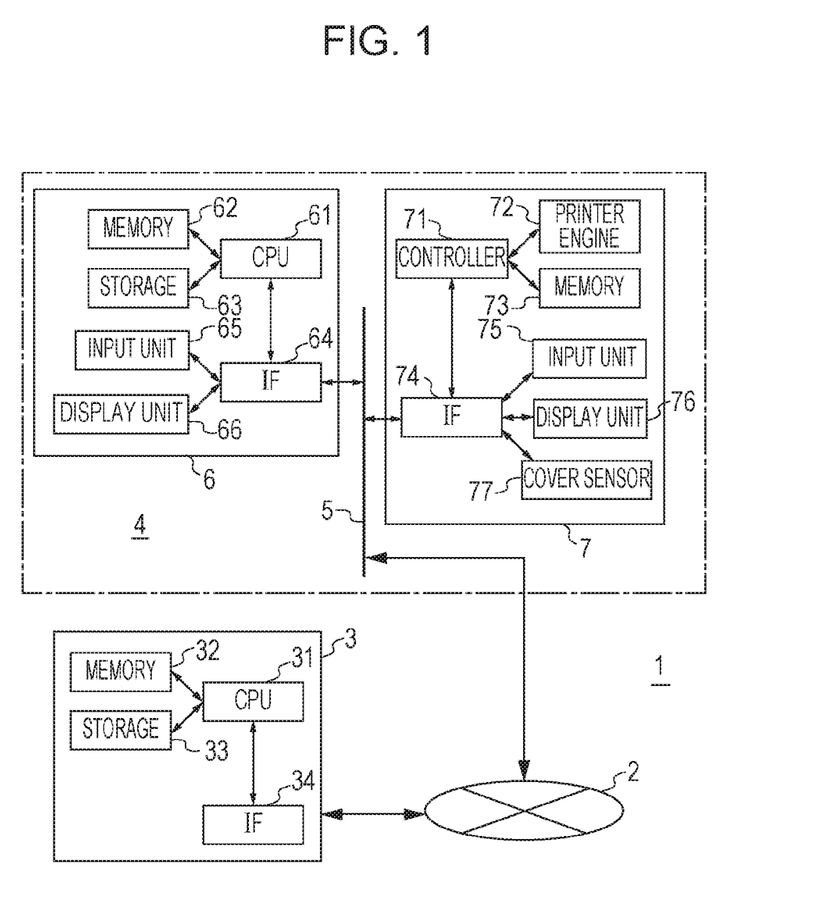
FIG. 1 is a block diagram that illustrates an example of the configuration of a monitoring system to which the invention can be applied.

FIG. 1 is a block diagram that illustrates an example of the configuration of a monitoring system to which the invention can be applied. In a monitoring system 1, a print processing system 4 and a management server 3 are communicably connected to each other via an Internet communication network 2. The print processing system 4 is built as a local area network (hereinafter abbreviated as "LAN") in which a personal computer (hereinafter abbreviated as "PC") 6 and a printer 7 are communicably connected to each other.

More specifically, each information terminal apparatus such as the PC 6 and the printer 7 is connected to a LAN bus 5 connected to the Internet communication network 2, which is a public telecommunications network, via a router that is not illustrated. Plural devices may be included in the print processing system 4 as each of these information terminal apparatuses. The connection between the above constituent elements may be either wired connection or wireless connection, as long as they can communicate with each other.

The PC 6 has the same hardware configuration as that of an ordinary personal computer. That is, the PC 6 includes a CPU (Central Processing Unit) 61, which controls each component/unit of the PC and performs arithmetic processing, a memory 62 for temporarily storing arithmetic data, a storage 63, in which control programs that are to be run by the CPU 61 and various kinds of data are stored, an interface (IF) 64 for external communication, an input unit 65 for accepting an operation input from a user, a display unit 66 for various kinds of notification to the user, and the like. They are electrically connected for data exchange to one another.

The PC 6 transmits various kinds of job data to the printer 7 in accordance with user operation and causes the printer 7 to execute a job. For example, the PC 6 causes the printer 7 to perform printing based on a print job. In addition, as the need arises, the PC 6 accesses the management server 3, in which running information on the printer 7 is stored, and acquires the running information.

The printer 7 has the same hardware configuration as that of an ordinary network printer. That is, the printer 7 includes a controller 71, which controls each component/unit of the printer and performs data processing, a printer engine 72, which performs operation of printing on a print medium, a memory 73 for temporarily storing image data, an interface (IF) 74 for external communication, an input unit 75 for accepting an operation input from a user, a display unit 76 for various kinds of notification to the user, and the like. They are electrically connected for data exchange to one another. In the description below, an ink-jet printer engine is taken as an example of the printer engine 72. However, the printing scheme is not limited to ink-jet printing. An alternative printing scheme may be employed.

The printer 7 may include a storage unit as in the PC 6 so as to be able to accept image data of large volume. On the premise that a user interface is offered on the PC 6, either one of, or both of, the input unit 75 and the display unit 76 may be simplified or omitted. The printer 7 included in the print processing system 4 may be a so-called local printer that is connected directly to the PC 6, that is, not via the LAN bus 5, instead of a so-called network printer in the system.

As the running information, the printer 7 stores, in its memory 73, information that indicates the running status of each of its components/units, wherein the running status changes when it is up and running. Examples of the running information are: the running time of the apparatus, the number of print pages, the time of power ON/OFF operation, operation button manipulation history, cover member open/closed status, the amount of ink left (or consumption amount), print medium replacement/replenishment history, a print setting change, and cleaning processing execution history. However, the running information is not limited to those enumerated above. Nor are all of them necessary.

The printer 7 is provided with a cover sensor 77, which is one example of a detector that detects the running status. The cover sensor 77 detects the open/closed status of a cover member by which the body of the apparatus is configured to be covered. It is possible to use a signal outputted from the cover sensor 77 as a part of the running information. The output of various sensors that detect the status of the components/units of the printer 7, for example, a sensor that detects the amount of ink left, a sensor that detects the presence/absence of a print medium, etc. can be used in addition to or in place of the output of the cover sensor.

The running information is transmitted to the management server 3. That is, the controller 71 periodically reads out the running information stored in the memory 73 and sends it out from the interface 74 to the management server 3 via the Internet communication network 2. Since the management server 3 monitors a plurality of printers as will be described later, the running information sent out contains individual identification information that makes it possible to uniquely identify the sender printer.

The management server 3 has a function of remotely monitoring the print processing system 4 that includes various terminal apparatuses that are interconnected via the LAN bus 5. The configuration of the management server 3 may be the same as that of an ordinary PC. Alternatively, the management server 3 may be a server-only machine in which an input unit and a display unit for user interface are simplified or omitted. Specifically, the management server 3 includes a CPU 31, a memory 32, a storage 33, and an interface (IF) 34, etc.

The management server 3 has a function of remotely monitoring the printer 7 in the print processing system 4, which is connected to the management server 3 via the Internet communication network 2. More specifically, running information that changes as the printer 7 runs is acquired from the printer 7 via the Internet communication network 2, and the acquired information is stored into a database in the storage 33. If, for example, any trouble has occurred in the printer 7, or if the printer 7 is about to run out of any consumable such as ink, the administrator of the print processing system 4 including the printer 7 is notified of the trouble, ink low, etc. As mentioned earlier, more than one printer 7 may be remotely monitored by the management server 3. In such a case, at the management server 3, the running information acquired from each printer 7 is identified on the basis of its individual identification information and is stored and managed individually. The management server 3 is installed and operated by, for example, the supplier of the printer 7, or a management company, etc. that is in charge of the maintenance and management thereof.

The print processing system 4 is a system for printing, on a specified print medium, an image the content of which is specified by a user who operates the PC 6. There is a wide variety of images that are printed by the print processing system 4. Examples are a text image created using document creation software, a graphic image created using drawing software, a photo image captured using a digital camera, and a scan image read by a scanner. There are various print media that differ depending on a combination of material (paper, resin film, cotton, etc.), optical characteristics (color, degree of transparency, glossy or not, etc.), and form (sheet-shaped, roll-shaped, three-dimensional printed matter, etc.).

Various kinds of the specific structure of the printer 7 are conceivable. Among them, two examples are shown below. In the description of printers 7a and 7b of the following two examples, the same reference numeral 72 as in FIG. 1 are assigned to printer engines that fulfill the same function in that both perform the principal part of print processing, though there are differences in shape and size therebetween.

Figure 2:
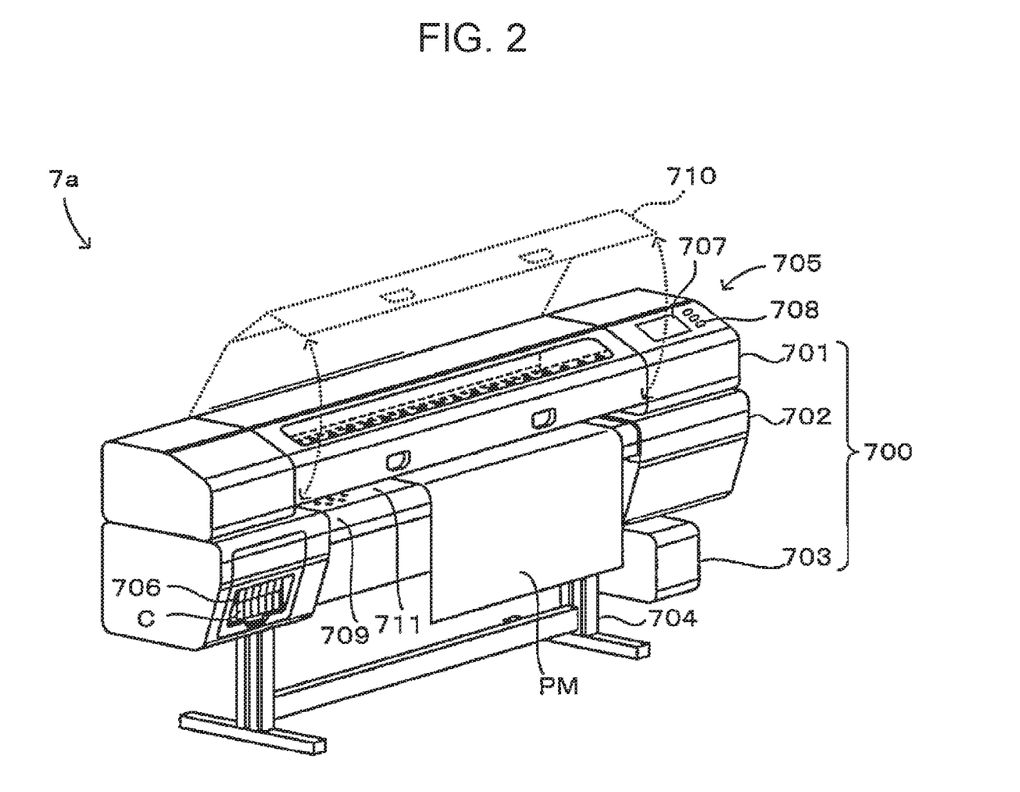
FIG. 2 is a diagram that illustrates an example of the structure of a printer.

FIG. 2 is a diagram that illustrates an example of the structure of a printer. A printer 7a according to a first structure example, which embodies the printer 7 illustrated in FIG. 1, is a so-called ink-jet printing apparatus. By ejecting ink droplets onto a print medium PM on the basis of received image data, the ink-jet printer 7a prints an image corresponding to the image data on the print medium PM. The print medium PM is, for example, large-sized sheet paper such as A1-size paper conforming to JIS (Japanese Industrial Standard), or roll paper that has the same paper width as that of an A1-size sheet. Alternatively, for example, cotton or a resin film, etc. may be used as the material of the print medium PM instead of paper. That is, the printer 7a performs printing on a print medium of comparatively large size and is used mainly in the production of commercial printed matters.

The printer 7a includes a body (enclosure) 700 and a leg portion 704. The body 700, which is supported by the leg portion 704, is a combination of three types of box members, specifically, an upper box member 701, a lower box member 702, and a compact box member 703. The upper box member 701 and the lower box member 702 are stacked in the vertical direction. An operation panel 705 is provided on the front right region of the upper box member 701. A cartridge holder 706 is provided on the front left region of the lower box member 702. Ink cartridges C, each of which contains ink, are mounted on the cartridge holder 706.

The operation panel 705 includes a touch panel 707. The touch panel 707 has a function of performing image display on a screen and a function of accepting a screen touch operation input. Various operation menus and parameters that relate to the operation of the printer 7a are displayed on the touch panel 707 by means of appropriate image objects such as buttons or icons. When the touch panel 707 is touched by a user, the function corresponding to the button displayed at the touched position is executed. The touch panel 707 provided as described above offers a GUI (Graphical User Interface) environment for operating the printer 7a to a user.

In addition, hardware keys 708 are provided on the operation panel 705. Each of the hardware keys 708 has a preset function to be executed when pressed. Operations that will be less frequently executed, for example, various kinds of operation settings, are designed to be performed through the manipulation of the touch panel 707 described above. This realizes many operations, even with small area size of the operation panel 705. Operations that will be frequently executed and operations that have to be processed immediately when necessary, for example, print start and print stop, are assigned to the hardware keys 708. For example, push buttons can be used as the hardware keys 708. In this case, the touch panel 707 has both of the function of the input unit 75 and the function of the display unit 76 illustrated in FIG. 1, and the hardware keys 708 also have the function of the input unit 75 illustrated in FIG. 1.

Though not illustrated, a spindle is horizontally provided behind (the rear in FIG. 2) the lower box member 702, and a roll is mounted on the spindle. An elongated print medium PM before printing is in the form of a roll thereon. It is possible to unreel the print medium PM from the roll into and through the gap between the upper box member 701 and the lower box member 702. The print medium PM unreeled from the roll is supported due to suction by a suction platen 711. In this state, the printer 7a, which uses the ink-jet method, ejects ink supplied from the ink cartridges C onto the print medium PM. As a result, an image is printed on the print medium PM. The print medium PM after printing performed in this way is fed to the front of the printer 7a and hangs down due to its own weight along a guiding surface 709, which is on the front of the printer 7a.

A part of the top at the middle region of the upper box member 701 is a cover member 710, which is configured to be able to be opened and closed. As indicated by the dotted line in FIG. 2, in a state in which the cover member 710 is opened upward, a part of the printer engine 72 (see FIG. 1), which is typically housed inside the upper box member 701, is exposed. This improves work efficiency in the maintenance work of the printer engine 72. In this exemplary mode, the cover sensor 77 (see FIG. 1) detects the open/closed status of the cover member 710.

Figure 3:
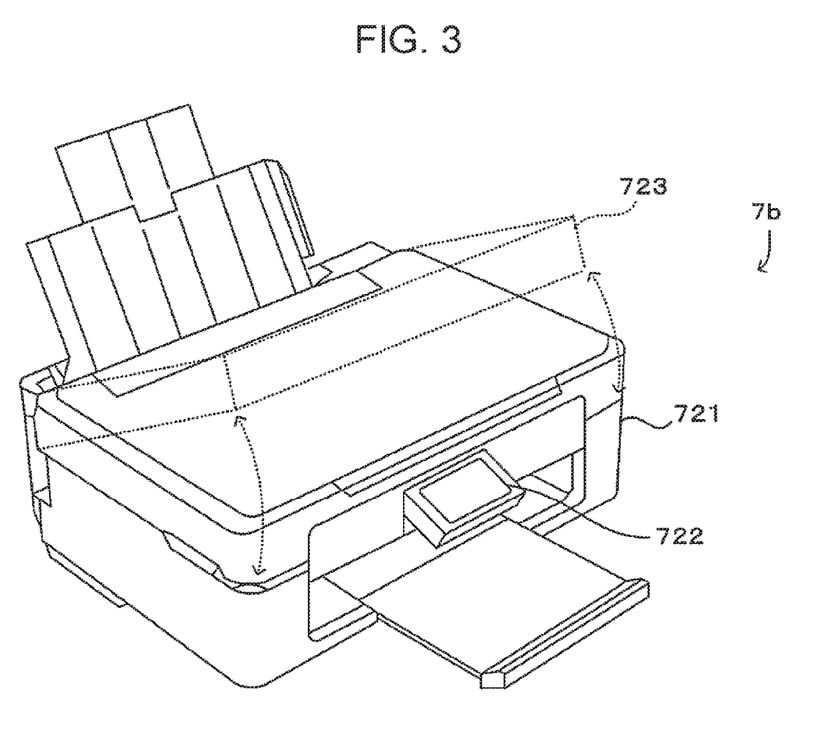
FIG. 3 is a diagram that illustrates another example of the structure of a printer.

FIG. 3 is a diagram that illustrates another example of the structure of a printer. A printer 7b according to a second structure example, which embodies the printer 7 illustrated in FIG. 1, is also a so-called ink-jet printing apparatus. By ejecting ink droplets onto a print medium on the basis of received image data, the ink-jet printer 7b prints an image corresponding to the image data on the print medium. A sheet-shaped medium of comparatively small size, for example, an A4-size sheet conforming to JIS or a letter-size sheet, can be used as the print medium. The material of the print medium is, for example, paper. Alternatively, cotton or a resin film, etc. may be used as the material of the print medium instead of paper. That is, the printer 7b performs printing on a print medium of comparatively small size and is used mainly for, for example, consumer printing.

The printer 7b according to this exemplary mode is provided with a touch panel 722, which is on the front of a body (enclosure) 721, and the printer engine 72 (see FIG. 1) is housed inside the enclosure 721. Various operation menus and parameters that relate to the operation of the printer 7b are displayed on the touch panel 722 by means of appropriate image objects such as buttons or icons. When the touch panel 722 is touched by a user, the function corresponding to the button displayed at the touched position is executed. The touch panel 722 provided as described above offers a GUI environment for operating the printer 7b to a user. In this case, the touch panel 722 has both of the function of the input unit 75 and the function of the display unit 76 illustrated in FIG. 1.

A part of the upper portion of the enclosure 721 is a cover member 723, which is configured to be able to be opened and closed. As indicated by the dotted line in FIG. 3, in a state in which the cover member 723 is opened upward, a part of the printer engine 72 (see FIG. 1), which is housed inside the enclosure 721, is exposed. This improves work efficiency in the maintenance work of the printer engine 72. In this exemplary mode, the cover sensor 77 (see FIG. 1) detects the open/closed status of the cover member 723.

As described above, the specific structure of the printer 7 can be embodied in a variety of modes. As its internal blocks, those illustrated schematically in FIG. 1 can be used. Next, user authentication processing in the monitoring system 1 will now be explained. For user authentication, basically the same processing described below can be applied irrespective of differences in the print format, structure, etc. of the printer 7.

As described earlier, in the monitoring system 1, running information that changes as the printer 7 runs is acquired by the management server 3. The running information is stored at the management server 3. The printer 7 transmits the running information to the management server 3 at appropriate timing. For example, the running information is transmitted when any change occurs in the running information or at predetermined time intervals. The running information is used for the purpose of monitoring the running status of the printer 7 by the management server 3. In addition to this purpose, when a user wants to know the running status of the printer 7, the running information is provided from the management server 3 to the PC 6 operated by the user. A user sometimes needs information on the running status of the printer 7 for the purpose of, for example, checking the amount of a consumable left.

However, the target of monitoring by a single management server 3 could be a plurality of print processing systems 4. In addition, in such a case, each of the print processing systems 4 could include a plurality of PCs 6 and printers 7. Ideally, running information that is provided to a certain user should be limited to information on a printer(s) 7 that is actually used by said certain user. For this purpose, in the monitoring system 1, before running information is provided to a user, user authentication processing, which is processing of associating the user with a printer(s) 7 regarding which the user is allowed to receive the running information, is performed.

Specifically, a user specifies one among printers 7 monitored by the management server 3, and makes a request for authentication to the management server 3. A right to access the running information on the specified printer 7 is granted to the user if the management server 3 authenticates the user. Accessing running information on a plurality of printers 7 by a single user is permissible if duly authenticated. The authenticated user is allowed to browse or acquire the running information on the printer 7 by operating the PC 6 and by accessing the management server 3 via the Internet communication network 2 as the need arises. In the description below, when a user is "authenticated" or "receives an authentication approval", it means that the user is acknowledged as an authorized user of the printer 7 by the management server 3 and is therefore granted a right to access the running information thereon.

Figure 4:
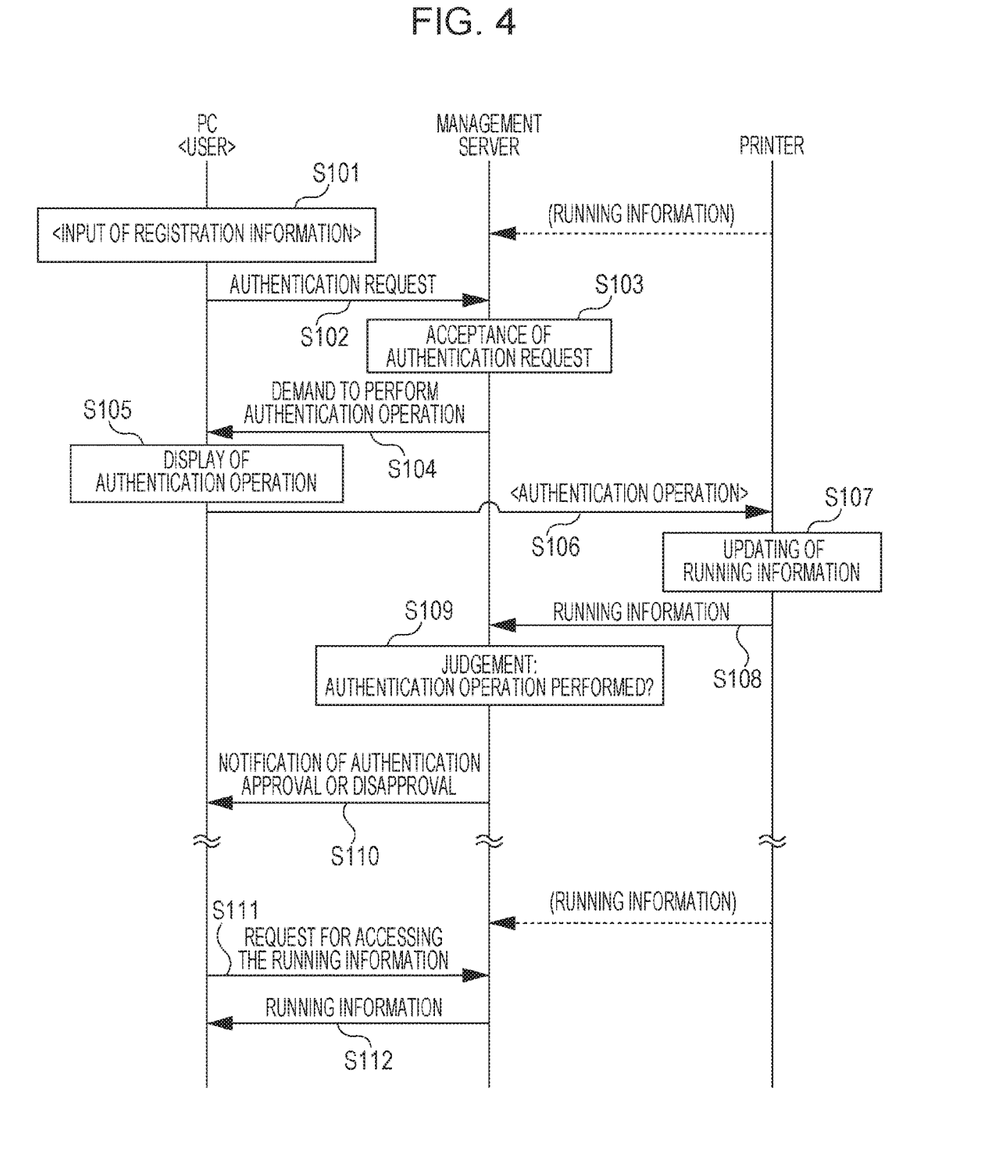
FIG. 4 is a first diagram that illustrates an example of the flow of user authentication processing.

Each of FIGS. 4 to 8 is a diagram that illustrates an example of the flow of user authentication processing. The most fundamental flow of user authentication processing according to the present embodiment is illustrated in FIG. 4. As illustrated in FIG. 4, user authentication processing is realized by cooperation of a user who wants to be authenticated, the PC 6 that is operated by the user, the management server 3, and the printer 7. In FIG. 4, those in angle brackets mean operation or "work" performed by the user. The same applies to FIGS. 5 to 8. User authentication processing is performed by the CPU 61 in the PC 6, by the CPU 31 in the management server 3, and by the controller 71 in the printer 7, each by running user authentication processing software that has been prepared in advance.

As indicated by the dotted-line arrow in FIG. 4, the running information on the printer 7 is transmitted from the printer 7 to the management server 3 as the occasion arises. A user who wants to be authenticated inputs registration information by operating the PC 6 in which user authentication processing software has been installed (step S101). The registration information is necessary for uniquely identifying the printer 7 regarding which the user wants to acquire the running information. For example, it is possible to use the model name and serial number of the printer 7 as the registration information, though not limited to them. The PC 6 transmits an authentication request including the inputted registration information to the management server 3 (step S102). The information transmitted to the management server 3 may contain information on the user, for example, the user name and/or the MAC address of the PC 6, etc.

Upon receipt of the authentication request (step S103), the management server 3 transmits, to the PC 6, an instruction regarding authentication operation that the user is demanded to perform (step S104). The PC 6 notifies the user of the need to perform the specified operation for authentication. For example, the PC 6 displays a message showing the content of the authentication operation on its display unit 66 and prompts the user to perform the authentication operation (step S105).

The authentication operation (operation for authentication) is operation that the user is demanded to perform for verification that the user is a true user of the printer 7 regarding which the user wants to access the running information. The authentication operation that the user is demanded to perform is operation that cannot be done unless the user is a person who is in a position to be able to actually use the printer 7. Specifically, it is suitable to demand, as the authentication operation, operation or work that gives rise to a change in at least a part of the running information on the printer 7 either as a result of direct action on the printer 7 by the user or as a result of some sort of indirect action to the printer 7 by the user via the PC 6.

A specific example of the authentication operation is operation that cannot be done unless the user touches the printer 7 directly, for example, power switch ON/OFF operation, cover member open/close operation, operation of pressing buttons in a predetermined sequential order, or predetermined input operation on the touch panel. The authentication operation may be operation that does not involve any direct touching of the printer 7 by the user but cannot be done unless the user is at the site where the printer 7 is installed; for example, a passcode that is made up of characters and/or symbols may be displayed on the display unit 76 of the printer 7, and the user may be demanded to visually interpret it for authentication.

Any of these examples of the authentication operation, or a combination of any of them, is instructed from the management server 3 to the PC 6, and the user is demanded to perform it. Preferably, for each authentication request from a user, the authentication operation that the user is demanded to perform should be varied. In order to prevent erroneous authentication caused due to accidental execution of the specified authentication operation by a third party, operation that will never be performed in ordinary use may be demanded as the authentication operation.

Upon execution of the authentication operation instructed via the display on the display unit 66 of the PC 6 by the user on the printer 7 (step S106), the running information that has changed in response to the execution of the authentication operation is updated and stored at the printer 7 (step S107). When there is a change in the running information, the running information after the update is transmitted from the printer 7 to the management server 3 (step S108).

On the basis of the running information received from the printer 7, the management server 3 judges whether the authentication operation has been performed or not (step S109). Specifically, if the change in the running information at the printer 7 after the user was demanded to perform the authentication operation includes a change occurring as a result of the execution of the specified authentication operation, it is judged that the user has performed the authentication operation as demanded. In this case, it is possible to acknowledge the person requesting for authentication as a true user who is in a position to be able to actually use the printer 7. Therefore, it is all right to grant a right to access the running information on the printer 7 to the user.

It is judged that the demand to perform the authentication operation has not been fulfilled if, in the running information, there is no change that matches the authentication operation upon the lapse of sufficient time after the demand. In this case, the access to the running information on the printer 7 is denied. This prohibits any person who is not an authorized user of the printer 7 from accessing the running information on the printer 7. Therefore, the leakage of the running information on the printer 7 to any third party does not occur.

The case where the authentication operation is not detected is not limited to the above case of an authentication request made by a person who is not an authorized user. Other examples are a case of an incorrect input of registration information by a user and a case of the execution of the instructed authentication operation on a wrong printer that is irrelevant to the request. User authentication is refused also in these cases. By this means, it is possible to avoid an authentication request from being approved of when an incorrect association of a user with a printer to be managed for the user remains uncorrected.

The management server 3 judges whether to approve of the user's request for authentication or not as described above, and transmits the result of judgment to the PC 6 (Step S110). If the request for authentication is approved of, among the printers 7 managed by the management server 3, regarding the printer 7 identified on the basis of the registration information entered by the user at the time of user authentication processing, a right to access the running information managed on the management server 3 is granted to the user.

Specifically, when the user makes a request for accessing the running information managed on the management server 3 via the PC 6 on an as-needed basis, the access request is transmitted from the PC 6 to the management server 3 (step S111). In response to the access request, the management server 3 transmits the latest running information on the printer 7 at this point in time to the PC 6 (step S112). The access is denied if the request for authentication is not approved of.

It is not necessary to execute the user authentication processing described above each time when a request for accessing the running information on the printer 7 is received from the user. That is, once the user is authenticated and acknowledged as an authorized user through the above processing, a simpler authentication method may be applied to a subsequent access process. For example, a combination of a login ID and a user password that have been determined in advance may be used for authentication. They may be determined as registration information in user authentication processing. Alternatively, a user whose request for authentication has been approved of through user authentication processing may be prompted to set a login ID and a user password.

The foregoing is the fundamental content of user authentication processing according to the present embodiment. It can be modified in various ways. For example, the content of the authentication operation, the judgment on the approval/disapproval of the authentication request, and the like may be modified. Some examples of them will now be explained. In FIGS. 5 to 8, the same reference numerals are assigned to processing steps that are substantially the same as those in FIG. 4, and an explanation of them is omitted below. In addition, operation after the approval of the authentication request is also the same in each of the examples below and, therefore, it is not explained.

Figure 5:
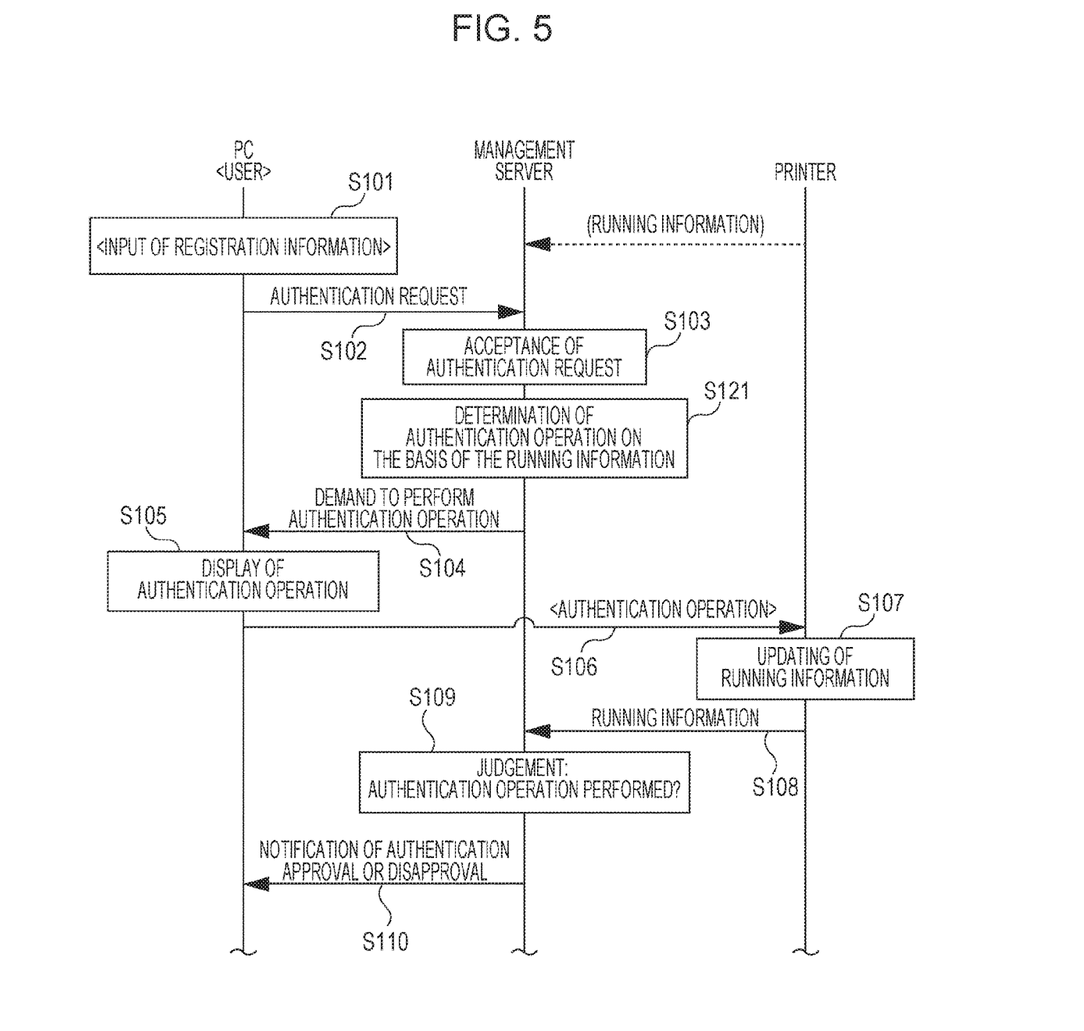
FIG. 5 is a second diagram that illustrates an example of the flow of user authentication processing.

In a processing example illustrated in FIG. 5, upon receipt of an authentication request from the PC 6 of the user (step S103), the management server 3 determines authentication operation on the basis of the requested running information on the printer 7 at this point in time (step S121). In this respect, the processing example illustrated in FIG. 5 is different from that of FIG. 4. Except for this difference, the processing of FIG. 5 is the same as that of FIG. 4.

The management server 3 is capable of knowing how each printer 7 is used by gathering the running information on the printer 7 each. For example, the management server 3 is capable of calculating, on the basis of the running information, for each printer 7, how often each operation is executed. The management server 3 can use the calculated execution frequency when specifying authentication operation.

That is, if operation that is performed frequently in ordinary use is specified as the authentication operation, there is a risk of erroneous authentication caused due to accidental execution of the operation coinciding with the specified authentication operation by a third party. It is possible to avoid such erroneous authentication by, for example, choosing operation that is rarely performed as the authentication operation on the basis of the running information on the printer 7 or by choosing a combination of operations the possibility of which is low in ordinary use as the authentication operation.

If the printer 7 is, for example, in an ink-low state, the user may be demanded to perform operation as a result of the execution of which the amount of ink left therein will be displayed on its display unit 76. By determining the authentication operation in this way on the basis of the running information, it is possible to make the execution of the authentication operation itself beneficial to the user.

As described above, in the processing example illustrated in FIG. 5, the content of the authentication operation that the user is demanded to perform is determined on the basis of the running status of the printer 7 regarding which the authentication was requested. Therefore, the risk of erroneous authentication caused due to accidental execution by a third party is low. When, for example, the printer 7 is currently in the process of executing a print job, operation that has no influence on the execution of the print job may be chosen as the authentication operation.

Figure 6:
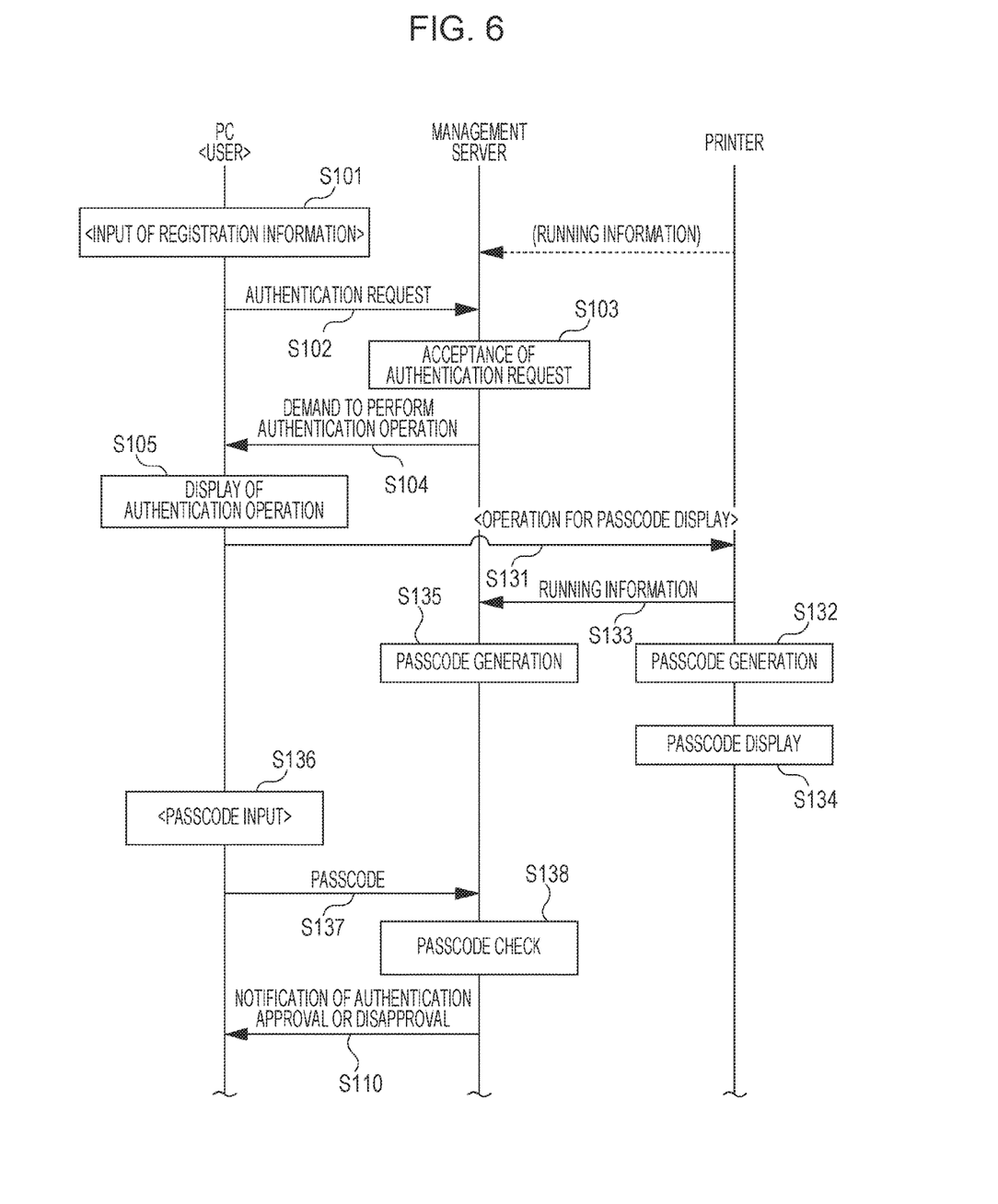
FIG. 6 is a third diagram that illustrates an example of the flow of user authentication processing.

In a processing example illustrated in FIG. 6, the content of the authentication operation that the user is demanded to perform is different from that of the above example. For this reason, processing also differs. Specifically, the authentication operation that the user is demanded to perform in a step S104 of this processing example is the operation of causing the printer 7 to display a predetermined passcode and reading it. The controller 71 of the printer 7 has a function of generating a passcode that is a combination of characters and/or symbols, etc. by applying the running information to a predetermined generation algorithm. Upon receipt of an instruction for passcode display from the user by button operation, etc. (step S131), the printer 7 generates a passcode on the basis of the running information at this point in time and the generation algorithm (step S132). The history of operation by the user is recorded. The updated running information is transmitted to the management server 3 (step S133).

The passcode generated in this way differs from one printer 7 to another; in addition, since it is a temporary code that depends on the running information at this point in time, even on the same printer 7, a different passcode is generated at each time of passcode generation. The generated passcode is displayed on the display unit 76 (step S134).

The management server 3 also generates a passcode based on the running information by using the same generation algorithm as that of the printer 7 (step S135). Therefore, the passcode generated by the management server 3 is supposed to be the same as the passcode generated by the printer 7.

The message displayed on the PC 6 for demanding the user to perform the authentication operation includes an instruction for inputting the passcode generated by the printer 7 into the PC 6. The user performs the operation for passcode display, and reads the passcode displayed in response to the user operation on the display unit 76 of the printer 7 and thereafter inputs it into the input unit 65 of the PC 6 in accordance with the instruction (step S136). The inputted passcode is transmitted from the PC 6 to the management server 3 (step S137).

The management server 3 checks the passcode received from the PC 6 against the passcode of its own generating (i.e., generated by the management server 3) (step S138). The user has to operate the printer 7 for passcode display and has to read the displayed passcode and input it into the PC 6. That is, unless the user is a person who is actually authorized to operate the printer 7, it is not possible to acquire a correct passcode. Therefore, it is possible to judge whether to approve of the user's request for authentication or not by checking whether the passcode inputted by the user agrees with the passcode generated by the management server 3 or not. That is, if the entered passcode agrees with the passcode generated by the management server 3, it is possible to acknowledge the requesting user as an authorized user. In this case, permission to access the running information is given to the user. If the correct passcode is not entered, permission to access the running information is not given to the user.

As described above, in the processing example illustrated in FIG. 6, the operation of causing the printer 7 to display a passcode and user's reading it and inputting it into the PC 6 is the authentication operation that the user is demanded to perform. Therefore, unless the user is a person who is actually authorized to perform these operations, it is not possible to receive an authentication approval. The passcode is generated by each of the printer 7 and the management server 3 on the basis of running information unique to the printer 7. Then, it is judged whether to approve of the user's request for authentication or not by checking whether the passcode inputted by the user agrees with the passcode generated by the management server 3 or not. For this reason, the risk of erroneous association of the user with the printer 7 in authentication processing is very low.

Figure 7:
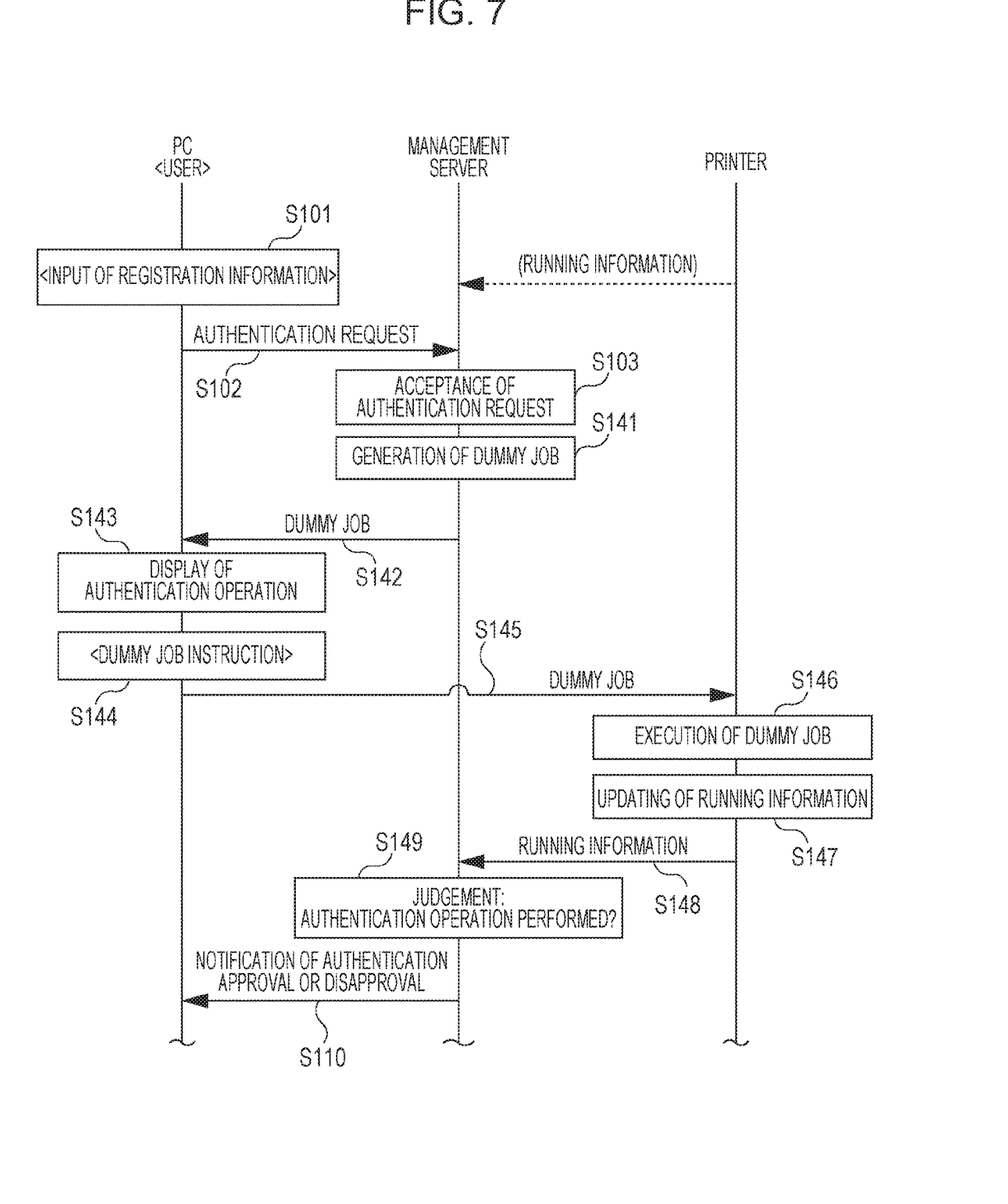
FIG. 7 is a fourth diagram that illustrates an example of the flow of user authentication processing.

In a processing example illustrated in FIG. 7, upon receipt of an authentication request (step S103), the management server 3 generates a dummy job (step S141) and transmits it to the PC 6 (step S142). The dummy job is a control command issued to the printer 7 for, by being given to the printer 7, giving rise to a change in the running information on the printer 7. The dummy job may be a job the execution of which is accompanied by no visible change in the operation of the printer 7 on its appearance, for example, data manipulation inside the printer 7. Alternatively, the dummy job may involve actual operation, for example, cleaning operation or print test operation.

In this case, the instruction given to the user for the authentication operation displayed on the display unit 66 of the PC 6 (step S143) is the operation of the PC 6 to transmit the given dummy job to the printer 7. That is, instead of automatically transferring the dummy job received by the PC 6 to the printer 7, it is not until the instruction-recipient user operates the PC 6 that the dummy job is sent out.

Upon execution (step S144) of the operation on the PC 6 by the user for transmitting the dummy job to the printer 7 in accordance with the instruction, the dummy job is transmitted from the PC 6 to the printer 7 (step S145). The printer 7 executes the dummy job (step S146) in the same way as in the execution of an ordinary print job. The printer 7 updates the running information (step S147) that changes as a result of the dummy job execution, and transmits it to the management server 3 (step S148).

The management server 3 detects the change in the running information to judge whether the dummy job that was specified as the authentication operation has been executed or not (step S149). That is, if the change in the running information matches the content of the dummy job, it is judged that the authentication operation has been performed by the user, resulting in the authentication of the user as an authorized user. If there is no change in the running information or if the change in the running information does not match the content of the dummy job, the authentication is refused.

As described above, the authentication operation in the processing example illustrated in FIG. 7 is to operate the printer 7 indirectly via the PC 6, instead of some sort of direct operation by the user with a direct touch on the printer 7. Similarly in this case, the grant is limited to the user who is authorized to operate the printer 7 by using the PC 6.

For example, suppose that the user of the PC 6 is remote from the site where the printer 7 is installed, though the PC 6 of the user belongs to same LAN as that of the printer 7. The processing example illustrated in FIG. 7 makes it possible to obtain the right to access the running information on the printer 7 in such a situation. The right to access the running information managed on the management server 3 regarding the printer 7 is not granted to any person who is not in a position to be able to operate the printer 7 via the PC 6.

Instead of transmitting the dummy job from the management server 3 to the PC 6 together with the demand to perform the authentication operation as described above, a dummy job download instruction may be sent from the management server 3 to the PC 6 first, and, after that, the dummy job may be downloaded from the management server 3 upon execution of user operation corresponding to the download instruction.

Figure 8:
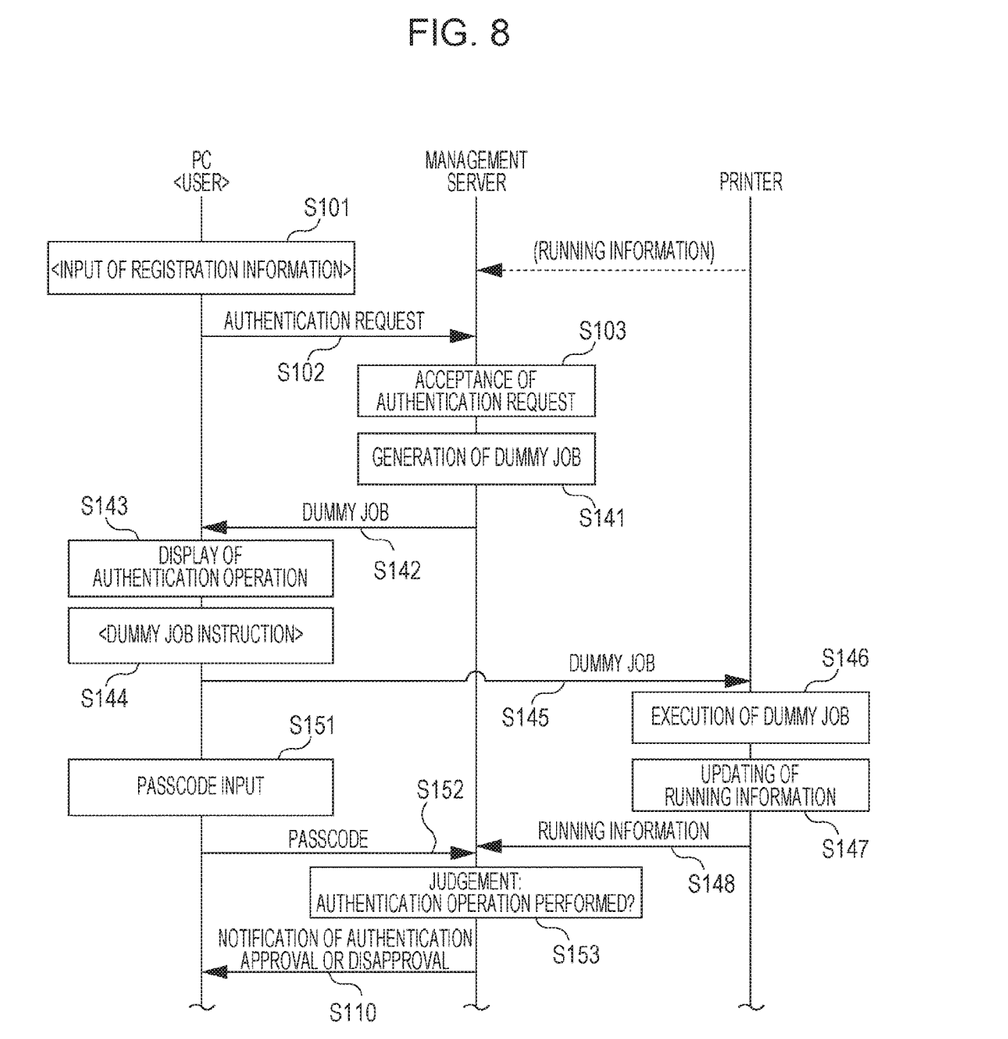
FIG. 8 is a fifth diagram that illustrates an example of the flow of user authentication processing.

A processing example illustrated in FIG. 8 is different from the processing example illustrated in FIG. 7 in terms of the content of a dummy job, and, because of this difference, is partially different therefrom in terms of the content of processing after dummy job execution. In the processing example illustrated in FIG. 8, a print job that contains, as a part of an image, the passcode generated by the management server 3 is used as the dummy job specified by the management server 3. When such a print job is executed at the printer 7 (step S146), an outputted printed matter contains the passcode. The running information that has changed as a result of the printing is updated and stored at the printer 7 (step S147) and is transmitted to the management server 3 (step S148).

In the instruction for the authentication operation (step S143), the user is demanded to input the passcode contained in the printed matter. Upon input of the passcode into the PC 6 by the user (step S151), the passcode is transmitted to the management server 3. If the printer 7 has a scanner function, the operation may be the scanning of the printed matter. Instead of using a passcode that is made up of characters and/or symbols, for example, a dummy job for printing a one-dimensional bar code or a two-dimensional bar code may be set, and the user may be demanded to send the result of bar code reading to the management server 3.

The management server 3 compares the received passcode with the passcode of its own generating, and judges whether the two agree with each other or not. By this means, the management server 3 is capable of detecting whether the specified authentication operation has been performed or not. On the basis of the detection result, it is judged whether to approve of the user's request for authentication or not.

As described above, in the processing example illustrated in FIG. 8, it is judged whether the user is an authorized user of the printer 7 or not by using a print job that contains a passcode in an image as a dummy job and by demanding the user to enter the passcode shown in the printed matter. In this exemplary mode, it is possible to operate the printer 7 via the PC 6 and possible to limit the person who receives an authentication approval to the person who is able to confirm the content of the printed matter outputted by the printer 7. Since the passcode generated by the management server 3 is necessary for authentication, the risk of erroneous authentication caused due to execution of the operation by a third party and the risk of erroneous association of the user with the printer are very low.

In all of the exemplary modes described above, the minimum required functions of the printer 7 are a function of accepting an operation input into the input unit 75 from the user and accepting a job input from the PC 6 and performing processing corresponding to these inputs and a function of sending out running information to the management server 3 when necessary. An ordinary network printer has these functions. That is, when the user authentication processing described above is performed, it is not necessary to perform any special data communication that is solely for this purpose between the PC 6 and the printer 7 and between the PC 6 and the management server 3. Therefore, it is sufficient as long as the printer 7 supports existing communication protocol.

It is possible to generate, by using software only, a passcode based on running information at the printer 7. Therefore, it can be realized just by including a passcode generation algorithm in firmware run by the controller 71, meaning that no special hardware that is solely for this purpose is necessary.

The minimum required functions of the PC 6 are a function of receiving data from the management server 3 and displaying it on the display unit 66, a function of transmitting data inputted by the user to the management server 3, and a function of transmitting job data to the printer 7. An ordinary computer has these functions. Therefore, it is sufficient as long as dedicated software for realizing functions for which the PC 6 is responsible in the processing described above, among others, for realizing a user interface function, is installed in the PC 6. Therefore, when the user authentication processing described above is performed, in particular, there is no cost that increases the burden of the user.

Figure 9:
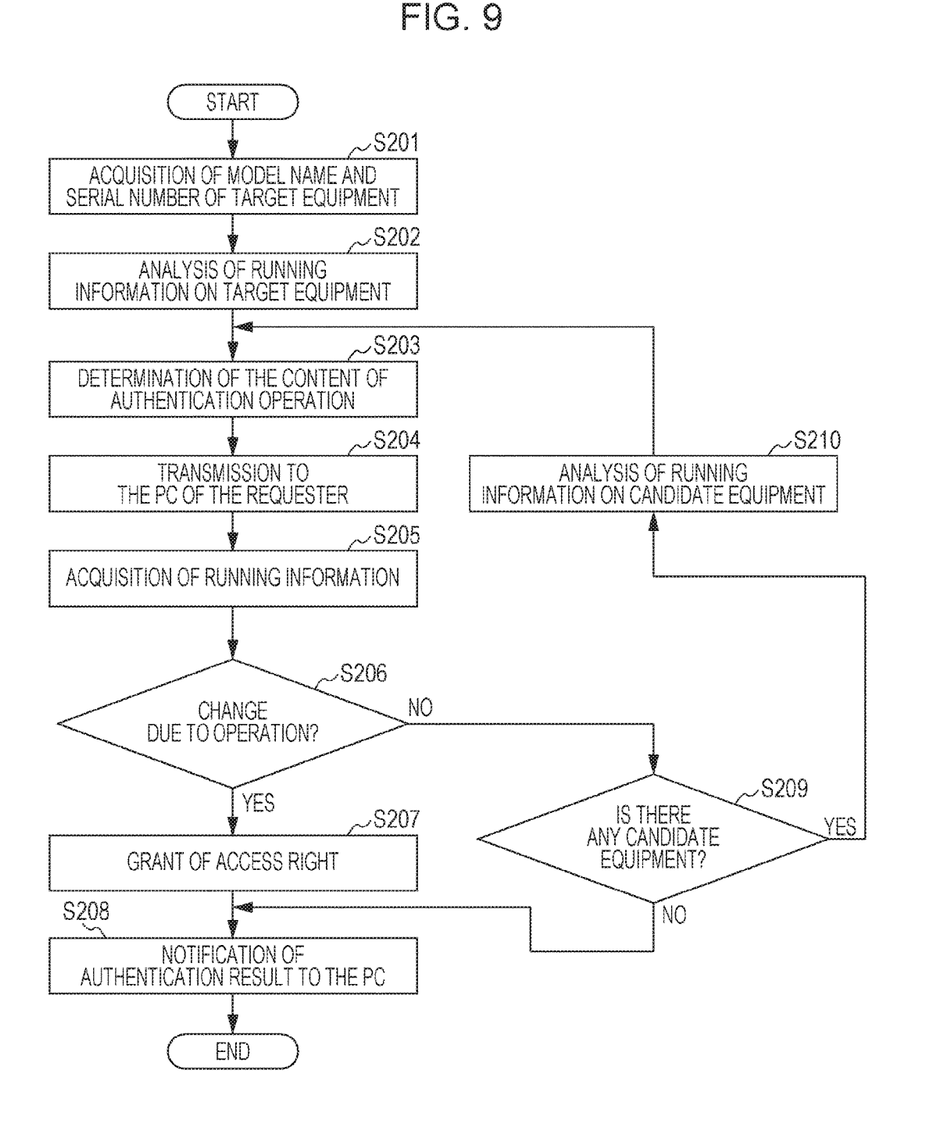
FIG. 9 is a flowchart that illustrates the operation of a management server in user authentication processing.

FIG. 9 is a flowchart that illustrates the operation of a management server in user authentication processing. This processing is realized by running control software pre-stored in the storage 33 by the CPU 31 of the management server 3. The management server 3 performs the processing illustrated in FIG. 9 for the user authentication described above. In the foregoing description, the authentication is refused when no authentication operation by the user is detected, even if it is due to a mistake in operation by the user. The processing described below includes relief measures against such an operation mistake.

Upon receipt of an authentication request from the PC 6 operated by the user, the management server 3 acquires, out of the registration information received from the PC 6, information that is necessary for identifying the printer 7 regarding which the user wants to access the running information (referred to as "target equipment" here), specifically, for example, the model name of the printer 7 and the serial number of the printer 7 (step S201). Then, the management server 3 extracts the running information on the printer 7 from the database in the storage 33 and analyzes it to know the running status of the printer 7 (step S202).

Next, the content of the authentication operation that the user is demanded to perform is determined (step S203). As described earlier, though various content of the authentication operation is conceivable, for the purpose of preventing erroneous authentication from occurring due to accidental execution or preventing a third party who is not an authorized user from being authenticated, preferably, the authentication operation that the user is demanded to perform should be varied for each request. The running information on the printer 7 is used for determining it, if necessary. The determined authentication operation is transmitted to the PC 6 operated by the user (step S204).

The running information that has changed as a result of the operation by the user is transmitted from the target equipment, and the management server 3 receives it (step S205). If, in the acquired running information, there is a change that matches the authentication operation that was specified (Yes in the step S206), it is possible to infer that the user has performed the specified authentication operation. Therefore, this user is acknowledged as an authorized user, and a right to access the database, or more specifically, a right to access the running information on the target equipment in the data stored in the database, is granted to the user (step S207). The user having been authenticated in this way is notified of an authentication result, which is sent to the PC 6 operated by the user (step S208).

If no change that matches the authentication operation is detected from the target equipment within a predetermined time period (No in the step S206), the procedure may be terminated with a notice of authentication refusal to the user as described earlier. However, in consideration of the possibility of an operation mistake by the user, the processing described here includes relief measures that are to be offered in a case of an authentication failure due to a mere operation mistake.

Specifically, a search is conducted to check whether, besides the target equipment identified on the basis of the registration information, there is any equipment that has characteristics that are similar to the characteristics of the target equipment in the database or not (step S209). It is possible to judge that it is similar if there is, for example, the following fact: the model name or the serial number resembles the content of the registration information; it is included in the same print processing system 4 as that of the authentication-requesting PC 6; the authentication-requesting user coincides with the user of the printer 7 obtained as a result of the analysis of the running information.

If such equipment exists, the equipment is treated as candidate equipment that is not the target equipment identified on the basis of the registration information but might have been intended by the user for selection as the target equipment. That is, if such candidate equipment exists in the database (Yes in the step S209), running information on the candidate equipment is analyzed (step S210), and the steps S203 to S206 are thereafter executed as if the candidate equipment were the target equipment. Upon detection of the execution of the authentication operation at the candidate equipment on the basis of the change in the running information (Yes in the step S206), the user is notified of authentication regarding the candidate equipment (steps S207 and S208).

Preferably, the user should be notified that the printer 7 regarding which the user has been authenticated is different from the one identified on the basis of the registration information that was entered by the user. In addition, the user may be asked whether it is all right to be authenticated regarding the printer 7 or not, and the user may judge it.

By this means, for example, even if a part of the serial number entered by the user is incorrect, it is possible to avoid an authentication failure from occurring as a result of the input error. Moreover, since the relief measures described above eliminate an authentication failure due to a mere operation mistake, for example, it is possible to enhance security against a malicious third party by shutting out any more authentication request from an authentication-refused user regarding the same printer 7.

In the user authentication method of the monitoring system 1 according to the present embodiment, it is possible to realize the processing described above by installing software for user authentication processing in the management server 3 and the PC 6. Therefore, it is not necessary to add any special hardware to the PC 6 and the printer 7. By this means, it is possible to prevent inappropriate authentication and reduce system management cost.

As described above, in the present embodiment, the management server 3 functions as "monitoring apparatus" according to aspects of the invention. The CPU 31 and the interface 34 of the management server 3 function as "judgment section" and "communication section" according to aspects of the invention, respectively. The printer 7 and the PC 6 function as "electronic equipment" and "terminal apparatus" according to aspects of the invention, respectively. The controller 71, the printer engine 72, the interface 74, and the display unit 76 of the printer 7 function as "code generation section", "printing section", "transmission section", and "notification section" according to aspects of the invention, respectively. The passcode in the embodiment described above corresponds to "authentication code" (code for authentication) according to aspects of the invention.

The scope of the invention is not limited to the embodiment described above. The embodiment described above can be modified in various ways within a range not departing from the gist and spirit thereof. For example, though it is described in the embodiment that the management server 3 is connected via the Internet communication network 2 to the print processing system 4 including the PC 6 and the printer 7 connected via the LAN bus 5, the management server 3 may be included in the LAN.

In the embodiment described above, the PC 6 included in the same LAN as that of the printer 7 functions as "terminal apparatus" according to aspects of the invention. Instead of the PC 6, however, for example, a tablet terminal or a smartphone may be used as "terminal apparatus" according to aspects of the invention. The user authentication processing described above is executable even without any communication between the terminal apparatus and the printer (electronic equipment). Therefore, a device that does not have a function for operating the printer may be used as "terminal apparatus".

It is described in the embodiment that, for example, the printer 7 stores the running information of its own. Instead of the described configuration, the printer may transmit the running information to the management server 3 on a real-time basis to cause the management server 3 to store the running information.

If there are plural printers 7 monitored by the management server 3, there is a possibility that operation that is the same as, or similar to, the authentication operation by the authentication-requesting user might be performed by a different user(s) on/to a different printer(s). In such a case, it follows that more than one printer regarding which operation that can be regarded as the authentication operation has been performed is detected at the management server 3. For the purpose of identifying the authentication-requested printer from among these printers, for example, the management server 3 may transmit the demand to perform authentication operation to the PC 6 operated by the authentication-requesting user again. In this case, the content of the authentication operation may be changed.

Though the embodiment described above includes, for example, the printer 7 functioning as "electronic equipment" according to aspects of the invention, the scope of application of the invention is not limited to printers. Various kinds of electronic equipment that is capable of acquiring running information that changes as it runs can be used as "electronic equipment" according to aspects of the invention.

What is claimed is:

1. A user authentication method in a monitoring system that communicates with electronic equipment and monitors the electronic equipment, the monitoring system performing processes comprising:

demanding a user to perform a predetermined authentication operation that gives rise to a change in running status of the electronic equipment;

acquiring, from the electronic equipment, running information that indicates the running status of the electronic equipment, the running status having changed due to the authentication operation, wherein the running information includes information for individual identification of the electronic equipment and information that changes as the electronic equipment runs;

detecting, on a basis of the running information, that the authentication operation has been performed in response to the demand to perform the authentication information; and permitting, upon detection, the user to access the running information acquired from the electronic equipment.

2. The user authentication method according to claim 1, wherein the monitoring system demands the authentication operation via a terminal apparatus operated by the user.

3. The user authentication method according to claim 1, wherein the authentication operation includes an operation of touching the electronic equipment by the user.

4. The user authentication method according to claim 1, wherein the authentication operation includes operation of inputting data specified by the monitoring system into the electronic equipment.

5. The user authentication method according to claim 1, wherein the electronic equipment generates an authentication code that is determined depending on the running information; and wherein the authentication operation includes an operation of acquiring the authentication code from the electronic equipment and transmitting the authentication code to the monitoring system.

6. The user authentication method according to claim 1, wherein the monitoring system demands the authentication operation in response to an authentication request from the user.

7. A monitoring apparatus that communicates with electronic equipment and monitors the electronic equipment, comprising:

a communication section that acquires, from the electronic equipment, running information that indicates running status of the electronic equipment, and transmits, to a terminal apparatus that is different from the electronic equipment, a control instruction for notification of a need to perform predetermined authentication operation that gives rise to a change in the running status of the electronic equipment, wherein the running information includes information for individual identification of the electronic equipment and information that changes as the electronic equipment runs; and a judgment section that judges whether the authentication operation has been performed or not on a basis of a change in the running information, wherein the user of the terminal apparatus is permitted to access the running information acquired from the electronic equipment in a case where the judgment section judges that the authentication operation has been performed in response to the notification.

* * * * *